Feb. 16, 1960     J. E. CANDLIN, JR., ET AL     2,925,050
SIDE FRAME CONSTRUCTION AND FINISH
Filed Jan. 9, 1957     9 Sheets-Sheet 1
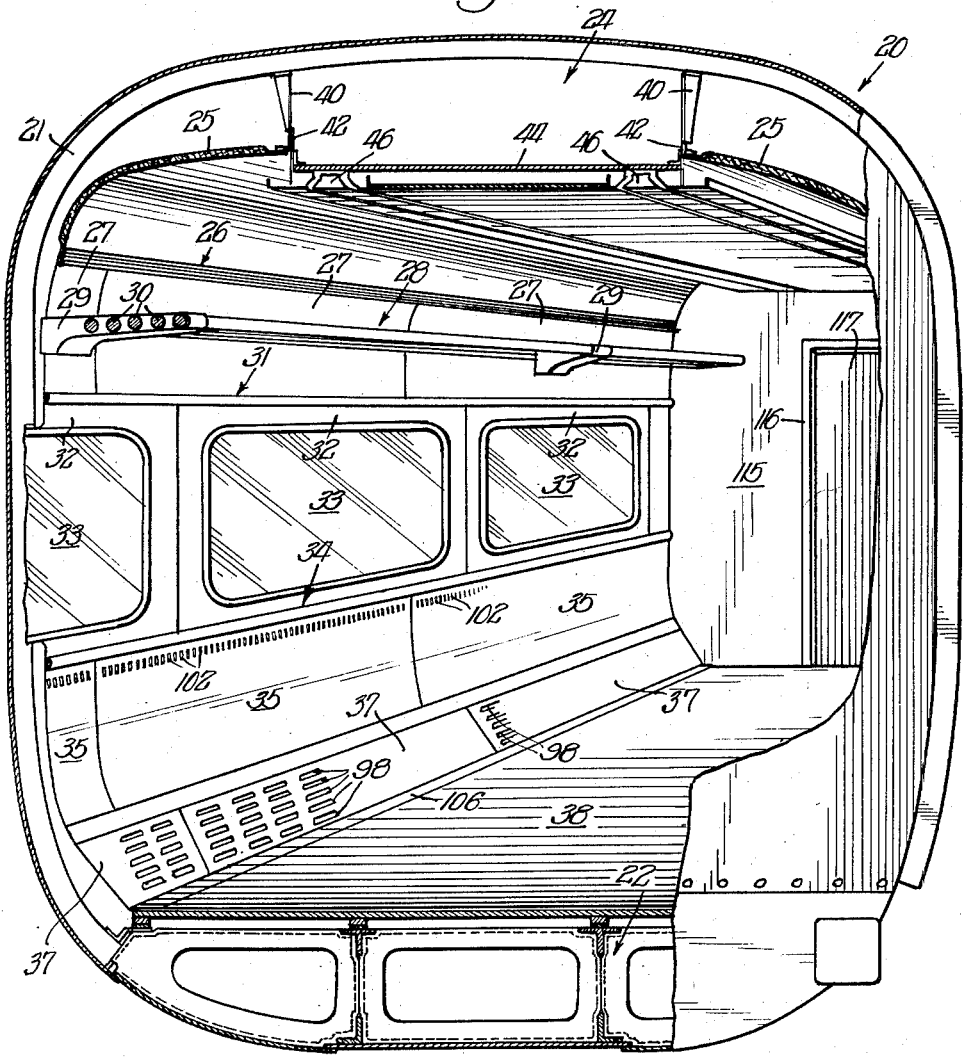
Inventors:
James E. Candlin, Jr.,
William Van Der Slugs,
By Cromwell, Greist & Warden
Attys

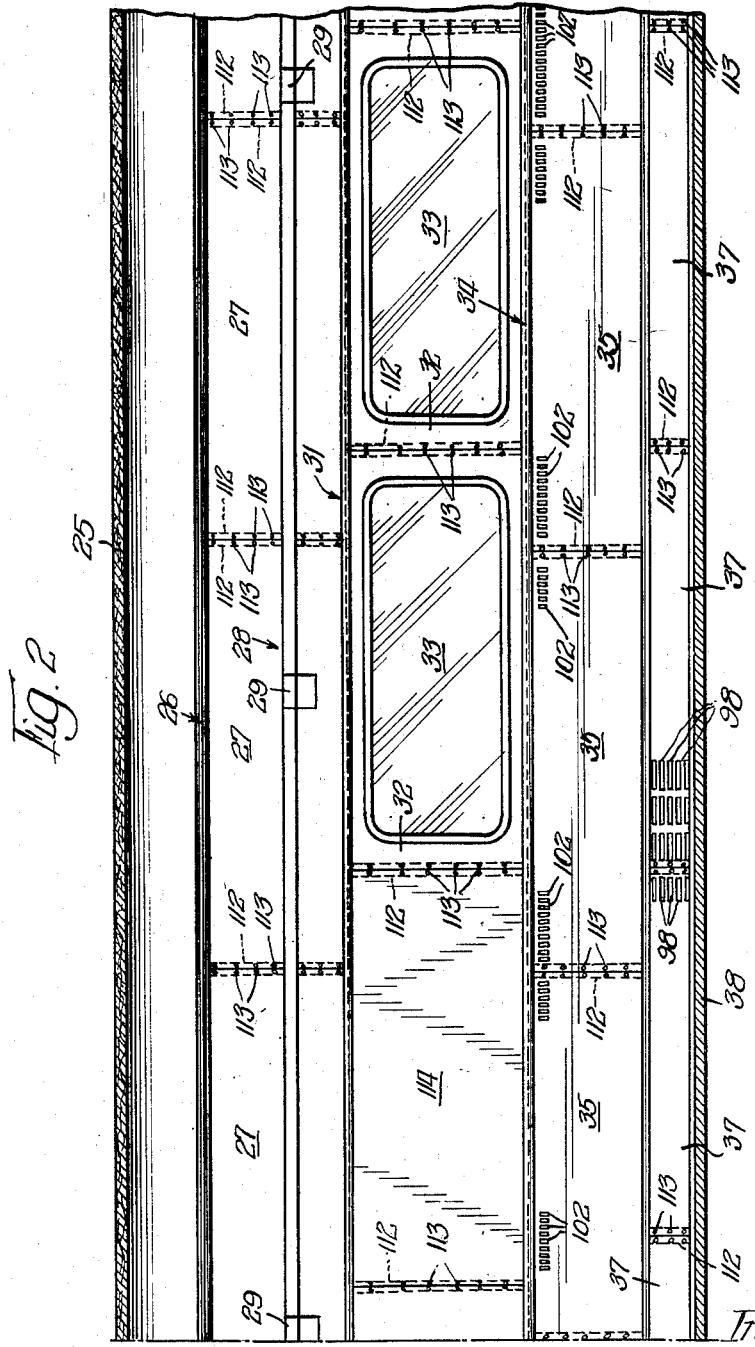

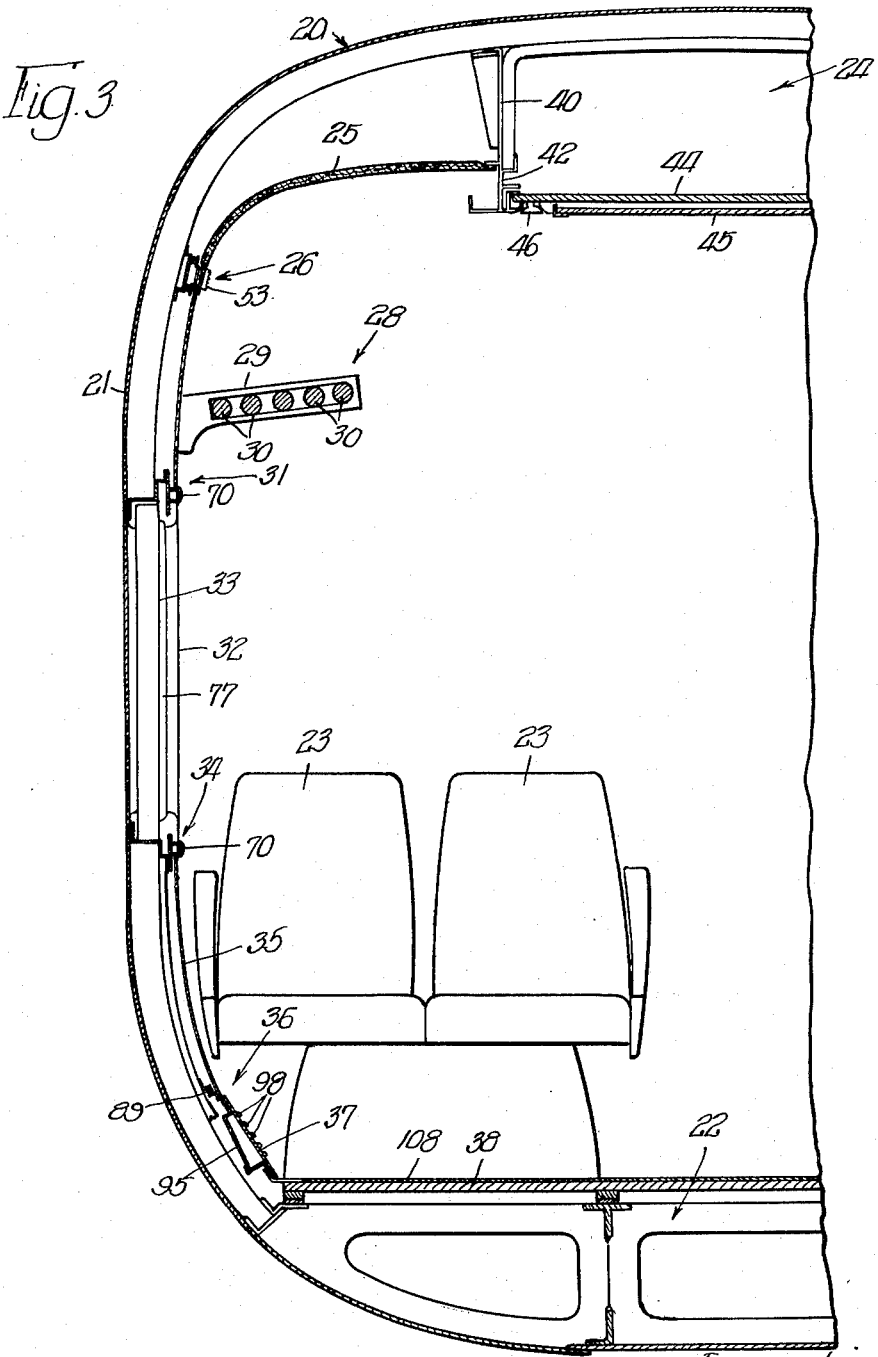

Feb. 16, 1960   J. E. CANDLIN, JR., ET AL   2,925,050
SIDE FRAME CONSTRUCTION AND FINISH
Filed Jan. 9, 1957   9 Sheets-Sheet 4
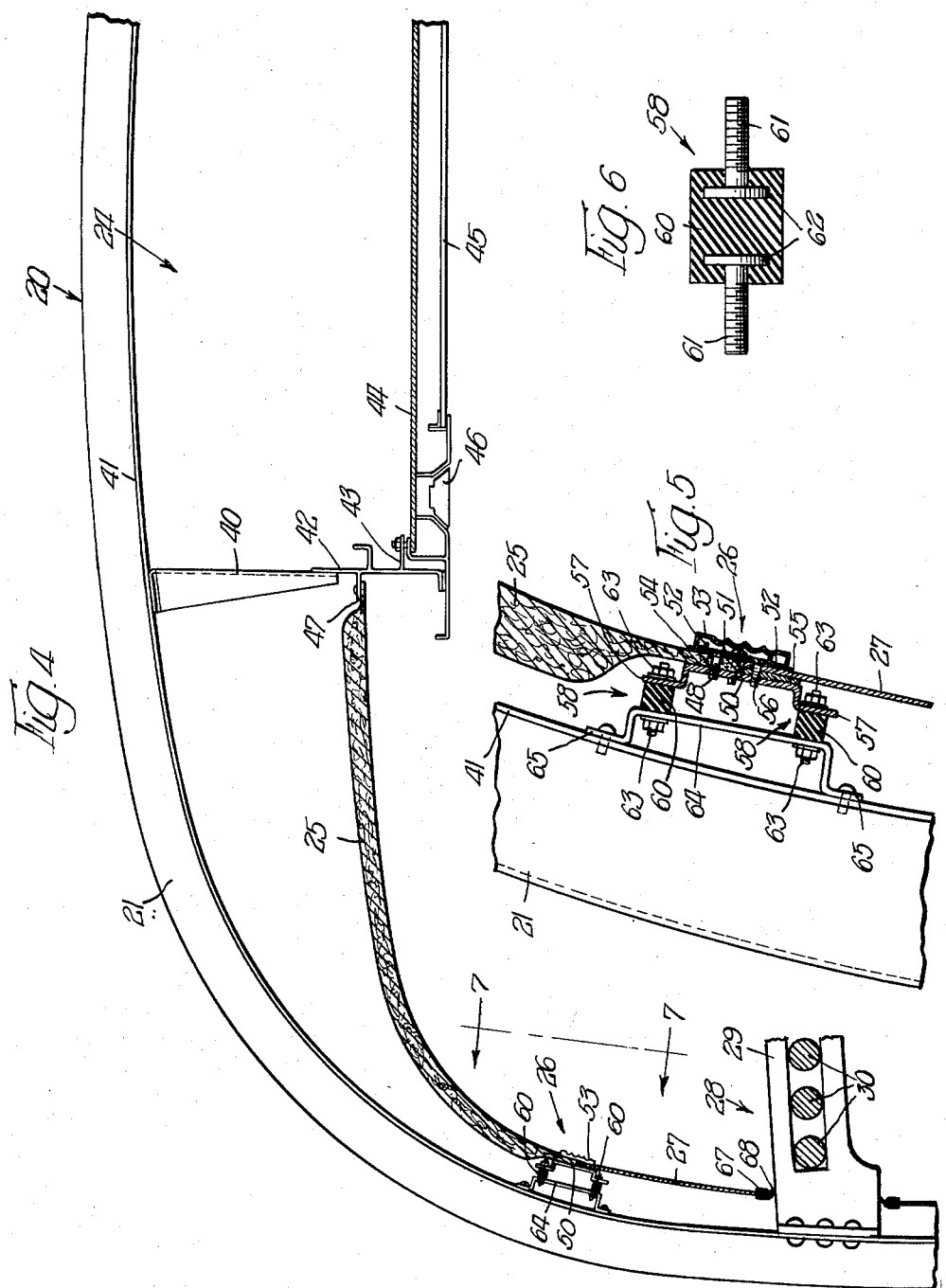
Inventors:
James E. Condlin, Jr.,
William Van Der Slugs,
By Cromwell, Greist & Warden
Attys

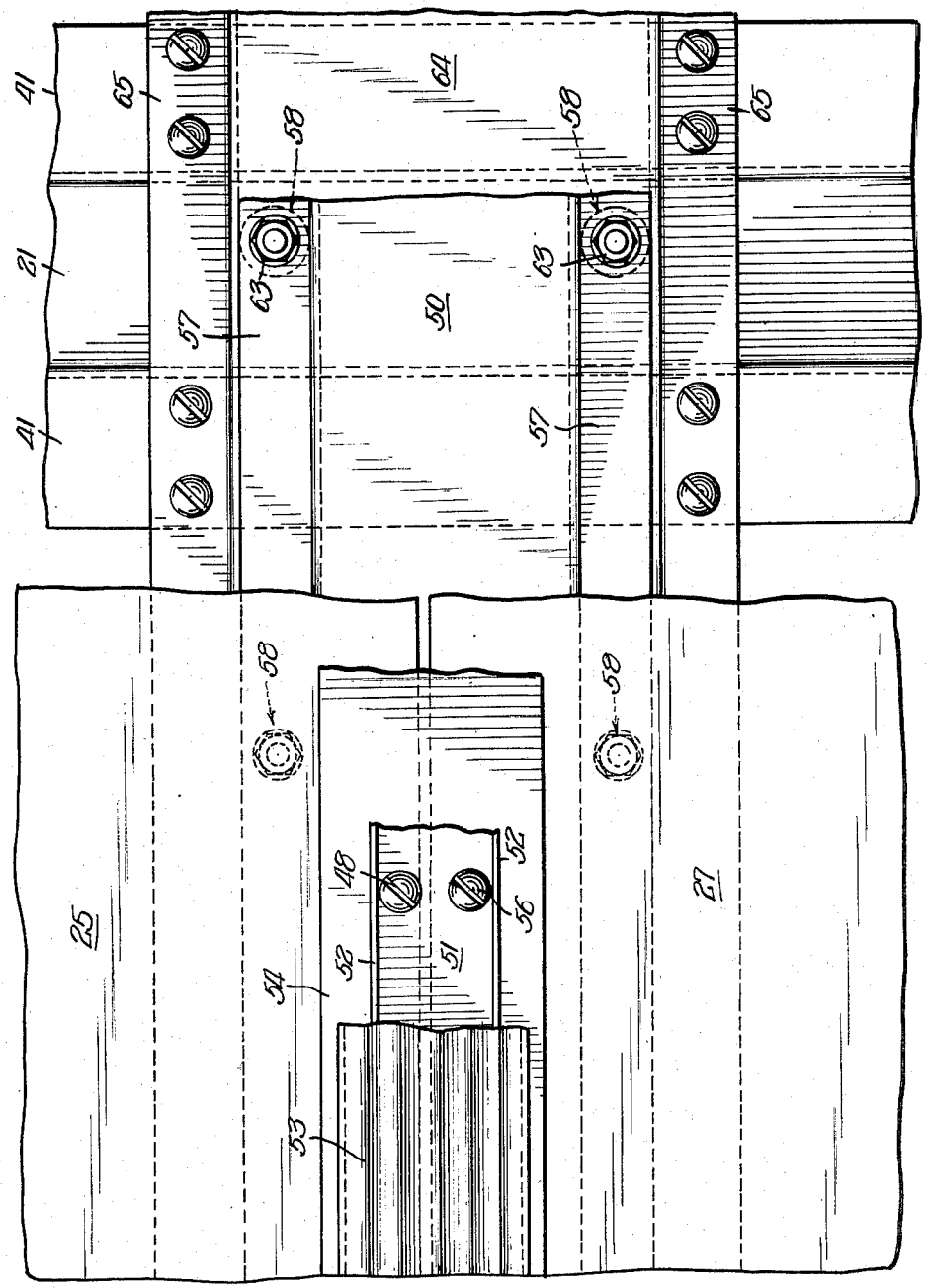

Feb. 16, 1960   J. E. CANDLIN, JR., ET AL   2,925,050
SIDE FRAME CONSTRUCTION AND FINISH
Filed Jan. 9, 1957   9 Sheets-Sheet 6

Inventors:
James E. Candlin, Jr.,
William Van Der Sluys,
By Cromwell, Greist & Warden
Attys

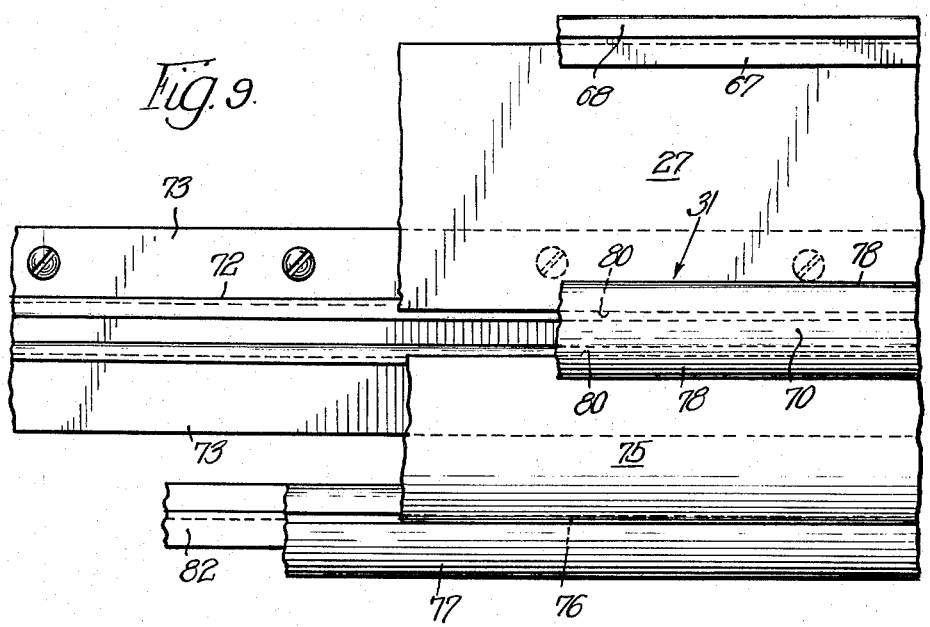
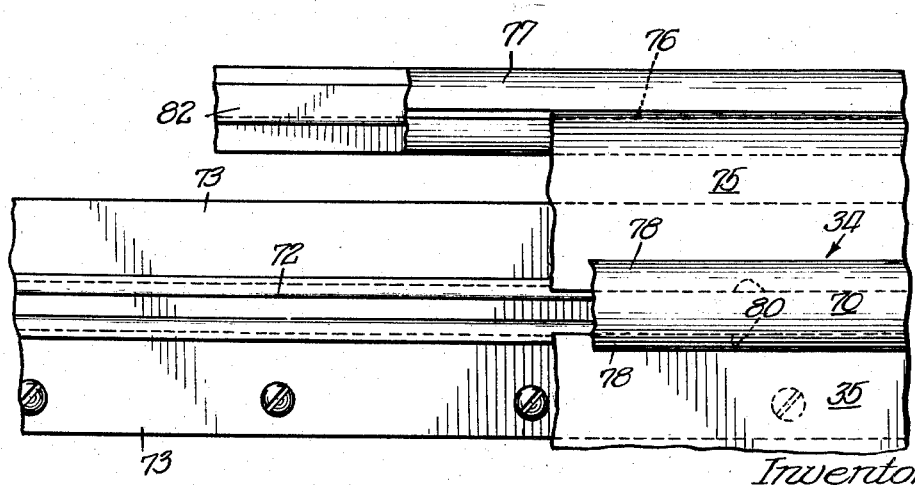

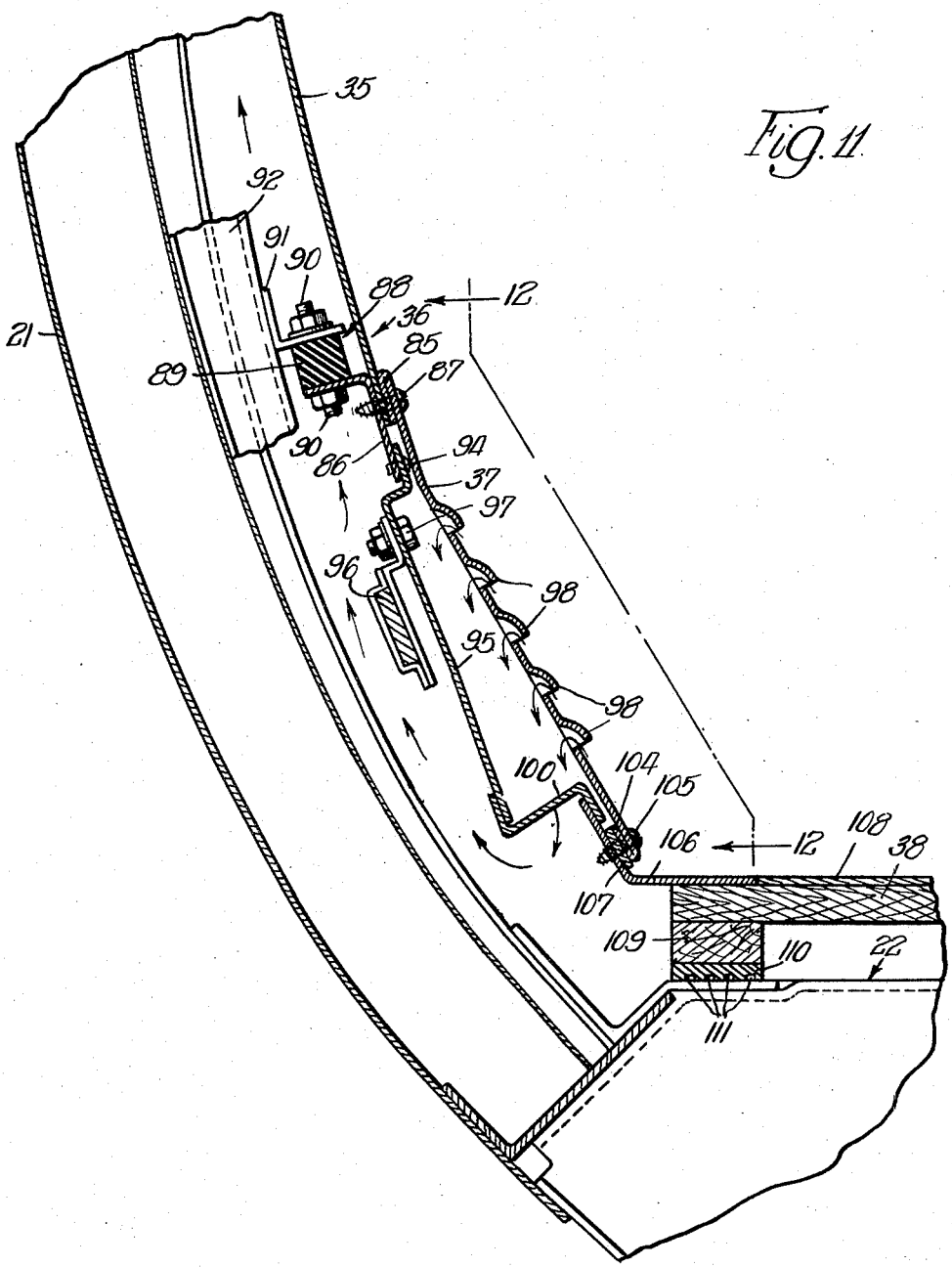

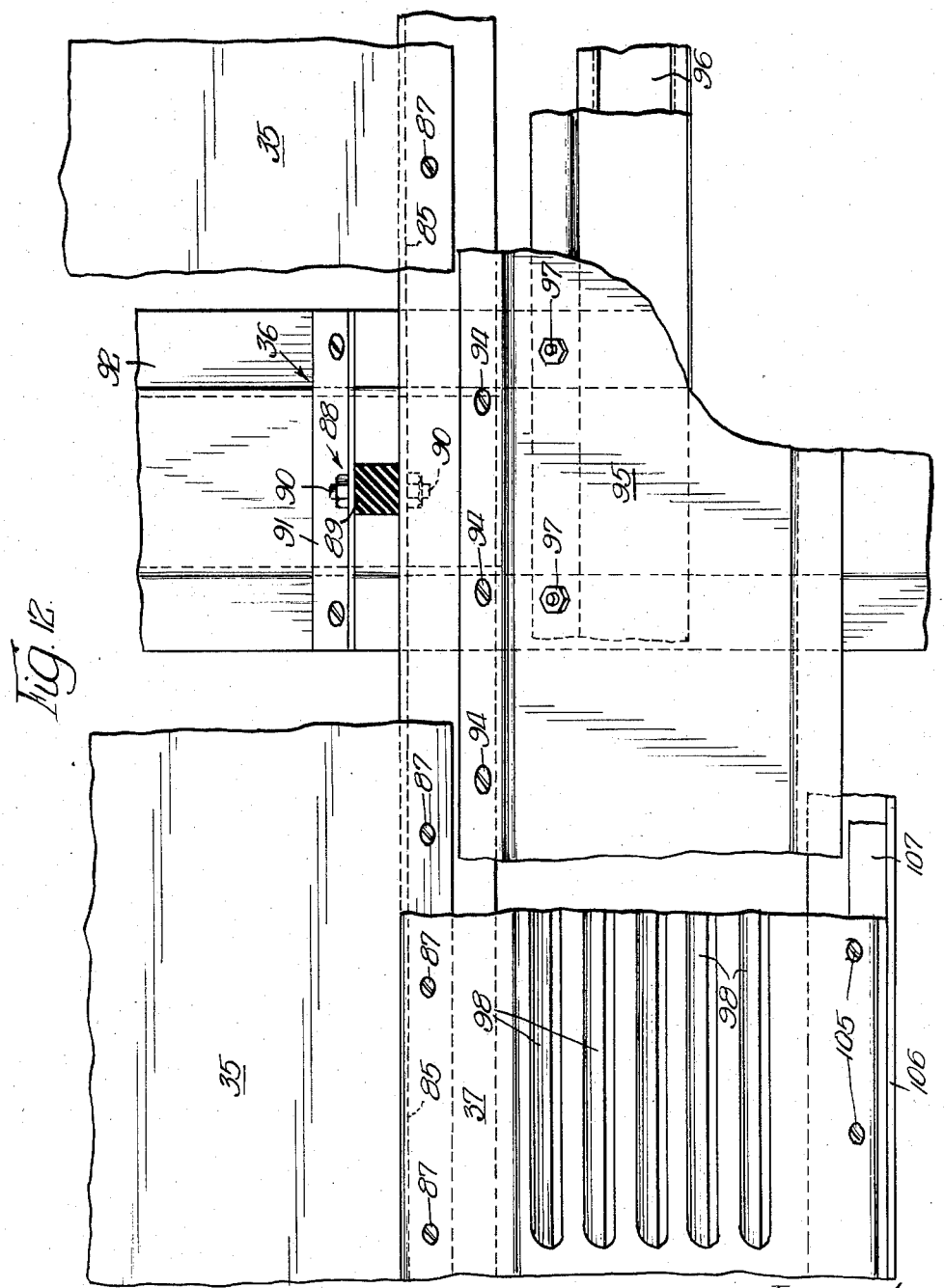

United States Patent Office 2,925,050
Patented Feb. 16, 1960

2,925,050

SIDE FRAME CONSTRUCTION AND FINISH

James E. Candlin, Jr., Lansing, and William Van Der Sluys, Homewood, Ill., assignors to Pullman Incorporated, a corporation of Delaware Application January 9, 1957, Serial No. 633,294

10 Claims. (Cl. 105—397)

The present invention relates generally to an improved form of interior finish construction for use in a vehicle, particularly railway cars. More specifically, the present invention is directed to an improved interior finish forming a part of a vehicle body construction which includes the use of a plurality of resiliently mounted panel sections defining the interior walls and side construction of the vehicle, the panels being mounted relative to one another and the outer vehicle frame construction to allow the panels to be readily mounted or replaced and further provide vibration dampening in connection with the establishment of a shell-within-a-shell arrangement, the inner shell being the interior finish and being substantially unaffected by vibration created or transmitted along the outer shell or frame construction while being structurally supported thereby.

In the design and manufacture of lightweight railway cars it is desirable to eliminate the number of structural members going into the makeup of a car in order to maintain the total weight of the same at a minimum while retaining adequate strength and wear characteristics to provide safe, long-life operation. In line with recent developments, railway cars have been provided with a tubular shape which aids, among other things, in maintaining the center of gravity as low as possible for high speed operation. Other efforts have resulted in the provision of single axle cars which are wheel-supported at one end and coupler-supported at the remaining end. In providing the single axle car construction, the total weight of the same is reduced by the elimination of a second wheel-carrying axle and the single axle associated with the car is positioned near one end thereof while the remaining end is supported by coupling with an axle end of an adjacent car. By these improvements in design, considerable advances have been made in providing a lightweight car with a low center of gravity which is capable of higher speed operation.

Further improvements have been made in the design and construction of the tubular outer frame of the car resulting in establishing the requisite strength while at the same time reducing the number of structural elements necessary to form the same. Railway cars manufactured with these improvements incorporated therein are not only capable of operation at higher speeds within safety requirements but are of reduced cost in both manufacture and maintenance. In car design of this nature it may be generally said that all of the structural elements forming the outer framework of the same are utilized to their utmost in meeting the strength requirements and thus functioning to dissipate operating forces imparted to the car during the use of the same. With a reduced number of structural elements forming the outer framework, the operational forces dissipated by the same are of a greater magnitude and their dissipation is more difficult to control with respect to preventing transmission of these forces into the interior finish of the car in such a manner as to interfere with passenger traveling comfort. Thus, with the advent of lightweight design and construction the problems of vibration transmission, heat loss and acoustic isolation have become more difficult to overcome. Still further, any efforts directed toward the overcoming of these problems must result in improvements which do not materially affect the total weight of the car or the cost of the same so as not to defeat the initial purpose of providing low cost, lightweight, high speed equipment.

It is an object of the present invention to provide an improved form of vehicle side frame construction and finish which exhibits lightweight, low cost and structurally uncomplicated features particularly adapted for use in the fabrication and manufacture of lightweight, high speed railway cars, the side frame construction and finish being formed from a series of resiliently mounted removable panels which are carried by the outer frame and which are substantially isolated therefrom by the resilient mounting of the same to maintain vibration transmission therebetween, heat loss and undesirable acoustic effects at a minimum.

A further object is to provide an interior finish construction adapted for resilient mounting relative to an outer frame, the interior finish construction including the use of a plurality of readily removable panels in the form of wainscoting, frieze and window trim panels which are resiliently and detachably mounted relative to one another and relative to the structural members of the outer frame supporting the same, the mounting members carrying the panels being of uncomplicated construction and utilizing different forms of flexible interconnections or panel edge-gripping means to provide a readily assembled or replaced interior finish construction of lightweight, low cost design.

An additional object is to provide an improved vehicle body construction utilizing a shell-within-a-shell design principle, the inner shell forming the interior finish and being structurally supported by the outer shell while being flexibly or resiliently mounted relative thereto in such a manner as to provide ease of assembly and replacement of panels forming parts thereof and vibration dampening and heat loss prevention, the inner shell including resiliently interconnected panel elements forming the interior side construction and interconnected at the lowermost edges thereof to a floor assembly which is resiliently carried by the bottom portion of the outer shell, the inner shell further including a partial inner ceiling construction flexibly and resiliently associated with a downwardly depending, utility-carrying structure which is rigidly attached to the outer shell and carried thereby.

Still a further object is to provide a side frame construction and finish of the type described in the foregoing objects in which the resilient panel mounting members are so designed and arranged to provide uniform panel mounting areas thereby allowing variation in interior design in conjunction with the number of windows or amount of interior dead wall space on either side of the vehicle, the variable features afforded by the arrangement of the resilient panel mounting members allowing variations in vehicle interior construction without requiring customized construction or predesigning thus resulting in standardization of elements and materials forming the side construction while allowing considerable variation in the use and combining of the same.

A further object is to provide an improved form of window trim panel mounting arrangement which allows ready replacement of a window trim panel by a dead light panel, the window trim panel being resiliently mounted relative to the window structure associated therewith as well as adjacent frieze and wainscoting panels to cooperate with these panels to provide an acoustically improved interior finish.

Another object is to provide interior finish panels which are resiliently mounted relative to an outer frame of a vehicle, these panels being adapted for supporting utility dispensing elements required in the functioning of the vehicle, the panels being readily removable for maintenance purposes in connection with the utility elements carried thereby, utility element mounting of this nature increasing the life and efficient functioning of the elements by isolating the same from operational vibration forces transmitted through the outer framework of the vehicle.

A further object is to provide an improved side frame construction of the type described in connection with the foregoing objects, the panels forming the interior finish thereof being resiliently carried by improved forms of resilient panel mounting members including resilient connecting elements, these elements including panel edge-gripping flexible lips which define therebetween an outwardly opening groove and which function to space the edge of the panel gripped thereby out of contact with the bottom surface or base of the groove thus providing compensation for possible misalignment of panel mounting members and panels while at the same time providing the requisite flexible support for the panels and being adapted to solidly back up the panels when the same are subjected to external forces applied thereto from the interior of the vehicle.

Other objects not specifically set forth will become apparent from the following detailed description made in conjunction with the drawings wherein:

Fig. 1 is a fragmentary perspective illustrating the interior finish of one side of a railway car incorporating the principles of the present invention;

Fig. 2 is a fragmentary elevation in partial section of the interior finish of the side frame construction;

Fig. 3 is an enlarged vertical half-section of the side frame construction and finish of the present invention;

Fig. 4 is an enlarged fragmentary sectional view of the upper portion of the side frame construction and finish of Fig. 3;

Fig. 5 is an enlarged fragmentary section of one form of interior finish panel mounting member forming a part of the upper side frame construction and finish of Fig. 4;

Fig. 6 is an enlarged detailed section of one form of resilient connector used in the side frame construction;

Fig. 7 is an enlarged fragmentary elevation having portions thereof progressively broken away to better illustrate the panel mounting member of Figs. 4 and 5, the elevational view of Fig. 7 being taken generally along line 7—7 of Fig. 4;

Fig. 9 is a detailed fragmentary view taken generally along line 9—9 of Fig. 8;

Fig. 10 is a detailed fragmentary elevational view taken generally along line 10—10 of Fig. 8;

Fig. 11 is an enlarged fragmentary vertical section of the lower portion of the side frame construction and finish; and Fig. 12 is a detailed fragmentary view in elevation taken generally along line 12—12 of Fig. 11.

Figure 8:
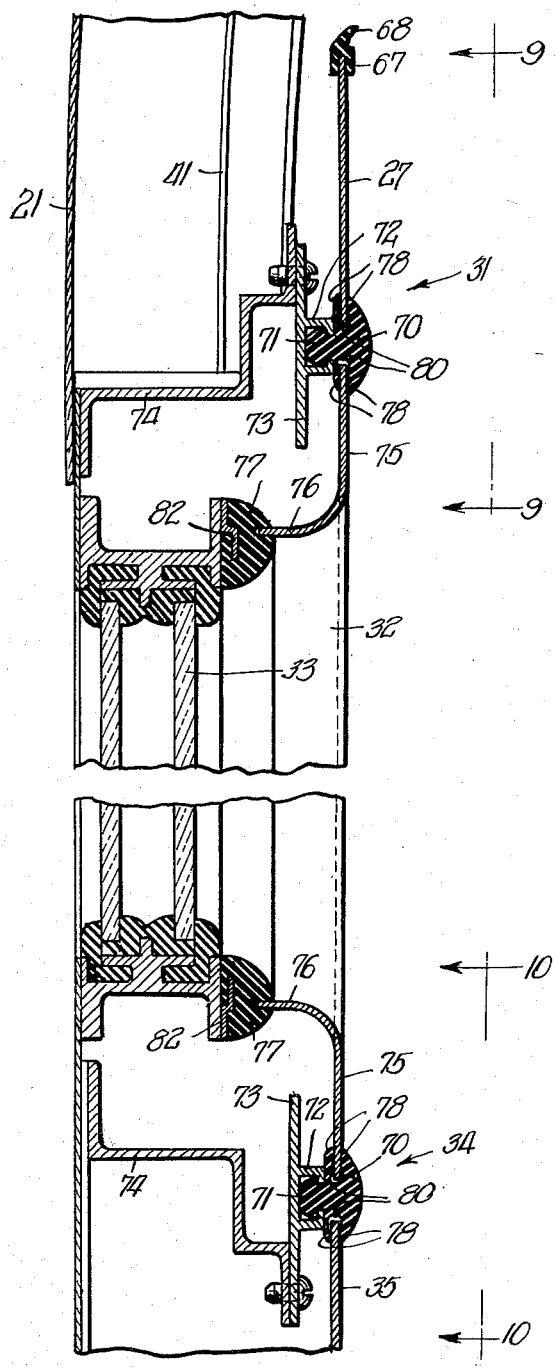
Fig. 8 is an enlarged fragmentary vertical section of the central portion of the side frame construction and finish illustrating different forms of panel mounting members.

In Figs. 1–3 the general arrangement of elements forming the side frame construction and finish of the present invention is illustrated. Referring specifically to Fig. 1, a fragmentary portion of a tubular railway car 20 is provided with an outer frame 21 formed from structural members which are of no particular consequence in connection with the interior finish forming the essence of the present invention. The outer frame 21 is suitably attached to an underframe generally designated by the numeral 22 and the particular structural elements forming both the outer frame and underframe are preferably of an improved design which provides the car 20 with lightweight structural features while being of sufficient strength to withstand operational forces encountered during the use of the car 20.

In Figs. 1–3 the interior finish is shown with respect to one inner side of the railway car 20, it being understood that the opposite side of the car is provided with the same type of interior finish, the interior of the car being symmetrically arranged to provide duplicate structural features on either side of the vertical center line thereof. Likewise, in these figures the interior ceiling and floor structures are only partially illustrated, it being understood that the complete structural features are repeated on either side of the vertical center line. The car 20 illustrated is a coach type railway car for passenger-carrying purposes and the passenger seats 23 diagrammatically illustrated in Fig. 3 have been deleted from the views of Figs. 1 and 2 to better illustrate the interior side construction and finish.

The new and improved side frame construction of the present invention generally includes a plurality of longitudinally extending series of removable interior finish panels resiliently mounted in end-to-end relation. The removable mounting of the panels is accomplished by a plurality of vertically spaced, longitudinally extending panel mounting members carried by the outer frame 21 and associated with the top and bottom edges of each of the panels of each of the series. In generally locating the various series of panels and the spaced panel mounting members, Figs. 1–3 illustrate a ceiling utility housing generally designated by the numeral 24. Extending from each side of the utility housing 24 is a flexible ceiling panel 25 attached along its lowermost margin to a longitudinally extending panel mounting arrangement 26. The uppermost edge portions of a series of end-to-end frieze panels 27 are attached to the panel mounting member 26 and a luggage rack 28 is mounted in association with the series of frieze panels 27 by a plurality of longitudinally spaced, inwardly directed supports 29 which extend through apertures in the frieze panels 27 in a manner to be described and are fixedly attached to the outer frame 21. The spaced supports 29 carry longitudinally extending rods or bars 30 mounted relative to the inner surface of the series of frieze panels 27 to complete the baggage rack construction.

The lowermost edge portions of the frieze panels 27 are attached to another form of longitudinally extending panel mounting member generally designated by the numeral 31. Below the panel mounting member 31 is a series of window trim panels 32 which are attached along their upper marginal edges to the mounting member 31. The window trim panels 32 are in the form of frames and are associated with longitudinally spaced window structures 33 which are carried by the outer frame 21. The lowermost edge portions of the window trim panels 32 are attached to and carried by a longitudinally extending panel mounting member 34 which has positioned therebelow and attached thereto a series of wainscoting panels 35. The lowermost edge portions of the wainscoting panels 35 are carried by a further longitudinally extending panel mounting member 36. Below the panel mounting member 36 is a series of air distributing or perimeter panels 37 which along their lowermost edge portions are attached to a flooring 38. The flooring 38 is carried by the underframing 22 in a manner to be described.

In specifically describing the elements forming the interior finish of the present invention, the upper portion of the over-all side frame construction and finish and the elements forming the same is specifically illustrated in Figs. 4–7. The overhead utility housing 24 as shown in Fig. 4 is box-like in shape being defined by downwardly depending side walls formed from a flange reinforced element 40 having the top portion thereof suitably fixed to a structural member 41 of the outer frame 21. The outer frame structural members are not illustrated in detail for purposes of simplification, it being understood that any suitable form of outer frame may be used in mounting the interior finish of the present invention. Attached to the lower portion of the longitudinally continuous side plate element 40 is a lower side plate 42 provided with a number of radially directed flange members for supporting attachment to certain utility elements normally found in railway car design. One of such radially directed flanges 43 supports a transverse plate 44 which in turn carries a translucent ceiling grill 45 extending the full length of the car 20. Suitable lighting fixtures are carried in association with the grill 45 which cooperate with marginal lighting fixtures 46 (schematically illustrated) to illuminate the interior of the railway car 20. The details of the lighting fixtures and other utility elements carried by the utility housing 24 are of no significance in connection with the essence of the present invention and, consequently, the drawings merely illustrate the general location and extent of the utility housing 24. The interior of this housing functions primarily as an air duct to provide conditioning air in cooling the interior of the car 20. In this connection suitable blower fans and outlet louvers form a part of the housing 24 to provide proper functioning and use of the utilities carried thereby.

Each ceiling panel 25 positioned on a side of the utility housing 24 is attached along its uppermost margin to a radially directed continuous flange 47. The ceiling 25 is relatively thick and is formed from flexible material such as woven or matted glass fibers impregnated and coated with flexible plastic material. The ceiling panel 25 is of sufficient thickness to provide the requisite strength while also being adequately flexible for a purpose to be described. Although the panel 25 is illustrated as a one-piece continuous member, the same may be formed from a plurality of panel sections interconnected with one another as will be described with reference to the frieze and wainscoting panels.

The lowermost marginal edge of the ceiling panel 25, as particularly shown in Figs. 5 and 7, is of reduced thickness and is attached at longitudinally spaced intervals by a series of screws 48 to a U-shaped, longitudinally continuous mounting strip 50. Each screw 48 extends through a continuous plate 51 having radially inwardly directed side flanges 52 which act as retainers for a snap-on decorative molding 53. A washer or sealing strip is fastened by the screws 48 intermediate the back surface of the retainer strip 51 and the opposite surface of the edge of the ceiling panel 25. Likewise, the upper marginal edge portions of each of the end-to-end frieze panels 27 are received between the spacer or washer strip 54 and the bracket-like mounting member 50. The panels 27, being considerably thinner than the lowermost marginal edge portion of the ceiling panel 25, require the use of a spacer strip 55 intermediate the same and the bracket-like mounting member 50. A series of longitudinally spaced screws 56 fixedly attach the upper marginal edges of the frieze panels 27 to the mounting member 50.

The upper and lower marginal edges of the continuous mounting element 50 are provided with integral flange portions 57 each of which is received against an end surface of a resilient connector generally designated by the numeral 58. As shown in Fig. 6, each resilient connector 58 is formed from a cylindrical body portion 60 of rubber or rubber-like material having imbedded in the opposite ends thereof outwardly directed threaded fasteners 61. Each of the fasteners 61 is provided with flange-like heads 62 which are imbedded in the material of the resilient body portion 60 and which are positioned out of contact with one another a substantial distance. One of the threaded fasteners 61 extends through a suitable hole in a flange portion 57 of the strip 50 and is attached thereto by a nut 63 or any other suitable means. The oppositely directed threaded fastener 61 is passed through an aligned hole in a second substantially U-shaped, continuous mounting strip 64 and fixed relative thereto by a nut 63. The mounting strip 64 is similarly provided with upwardly and downwardly directed, continuous flange portions 65 which are suitably attached by rivets or any other type of fastener to the inner structural member 41 of the outer frame construction 21.

The illustration of Fig. 7 sets forth the continuous nature of the various elements forming the panel mounting member 26 and it should be understood that the elements described either extend continuously the full length of the railway car 20 or are positioned at spaced intervals therealong. The ceiling panel 25 and frieze panels 27 are fixedly attached to the continuous mounting strip 50. By use of the resilient connectors 58, the continuous mounting strip 50 is resiliently attached to the second continuous mounting strip 64. Consequently, vibrations occurring in the outer frame 21 and passed onto the continuous mounting strip 64 are absorbed or dispelled by the resilient connector elements 58 and the innermost continuous mounting strip 50 and the elements associated therewith are substantially isolated from the outer frame 21. Relative movement between the members forming the interior finish and the members attached to the outer frame 21 may occur thus compensating for torsional bending of the structural members forming the outer frame 21 and alleviating transmission of these forces to the interior finish of the car which may cause damage to the relative ligthweight structural elements of the same.

The ceiling panel 25 at its uppermost margin is fixedly attached to the outer frame 21 through the structural members 40 and 42 defining the utility housing 24. Consequently, operational forces may be transmitted from the outer frame directly to the ceiling panel 25. The lowermost margin of the ceiling panel 25, however, is resiliently isolated from the outer frame by the elements of the panel mounting member 26 described. By forming the ceiling panel 25 from inherently flexible material any operational forces transmitted to the same through the utility housing 24 are dissipated within the ceiling panel 25 and such forces are not subsequently transmitted directly into the frieze panels 27 and ultimately into the remaining structural members of the interior finish.

The structural supporting members 29 of the baggage rack 28 are each fixedly attached to the structural member 41 of the outer frame 21. This arrangement is shown in Fig. 4 and it will be noted that the edges of the frieze panels 27 defining the aperture through which a baggage rack support 29 extends is supplied with a continuous resilient mounting and sealing member 67 which is provided with an outwardly directed groove defined by flexible lips gripping the marginal edge portion of the frieze panels. The strip 67 is further provided with an oppositely directed flexible lip 68 which is placed in sealing engagement with the outer surfaces of the baggage rack support 29. The strip 67 is preferably formed from rubber or rubber-like material and, as shown in Fig. 4, the edge of the frieze panel 27 defining the aperture surrounding the baggage rack support 29 is spaced a substantial distance from the surface of the baggage rack support 29. The strip 67 is used to fill this space and provide resilient means intermediate the free edges of the frieze panel 27 and the surfaces of the support 29. Consequently upon movement of the baggage rack support 29 with the outer frame 21 relative to the interior finish, adequate space is provided to prevent engagement between the support 29 and the edge of the frieze panel 27 surrounding the same. The flexible strip 67 with its integral lip 68 continuously fills this space to prevent heat loss and operational sound transmission.

The bottom edge margins of the series of frieze panels 27 are resiliently held by the panel mounting member 31 which is illustrated in detail in Figs. 8 and 9. The mounting member 31 is formed from a resilient rubber or rubber-like mounting strip 70 which extends continuously, longitudinally of the car 20. The strip 70 is formed with a body portion 71 which is in the shape of an arrowhead compressibly received within a channel 72 formed integral on a longitudinally extending outer structural member 73 positioned above the window structure 33 and suitably attached to an outer structural element 74 forming a part of the outer frame 21. The window trim panels 32 are each substantially J-shaped in cross section formed from integral leg portions 75 and 76, the horizontal parts of the leg portion 75 being aligned with the lower edges of the frieze panels 27 and the upper edges of the wainscoting panels 35. The radially outwardly directed leg portion 76 is mounted relative to the window structure 33 by a resilient mounting member 77 which is formed from rubber or rubber-like material.

The strip 70 is provided with oppositely directed pairs of flexible lips or fingers 78 which, as illustrated, converge toward one another in an outward direction to grip the marginal edge portions of the frieze panel 27 and window trim panel 32. Each pair of flexible lips 78 defines an outwardly opening groove 80 which at its innermost portion is of greater width than the thickness of the panels 27 and 32. The edge surfaces of the panels 27 and 32 are received within the grooves 80 in spaced relation to the end walls or base thereof and are freely movable within these grooves due to the greater width of the grooves toward the base thereof. Each pair of lips 78 grips marginal portions of the panels 27 and 32 inwardly of the edges thereof to resiliently mount the same relative to the structural frame member 73. The body portion 71 of the mounting strip 70 is wedgingly received within the continuous channel 72 to be retained thereby thus fixedly mounting the strip 70 in its operative position.

With the flexibility of the material of the strip 70 and the degree of freedom of movement of the edges of the panels 27 and 32 within the grooves 80, adequate floating action is provided to at least substantially isolate the panels 27 and 32 from operational forces transmitted through the outer frame 21. The contour of the grooves 80 further compensate for any misalignment of panels when the same are mounted. While the panels 27 and 32 are thus flexibly mounted relative to the outer frame 21, they are still adequately held so as to be capable of withstanding external pressures or forces applied thereto from the interior of the car. Since only the smallest movement is allowed due to the presence of the clearance at the base of the grooves 80, the application of forces from the interior of the car would not result in displacement of the panels.

The radially outwardly directed leg portion 76 of the window trim panel 32 is, as previously described, resiliently carried by a rubber or rubber-like mounting strip 77 which, in turn, is attached to the window construction 33. As illustrated in Fig. 8, the resilient mounting strip 77 extends about the full perimeter of the inner surface of the window structure 33, but it can be readily appreciated that the radially outwardly directed leg portion 76 could just as well be carried along the top and bottom horizontally extending portions by separated and vertically spaced longitudinally extending resilient mounting strips 77. The window structure 33 may be of any known design and is suitably carried by the outer frame 21. The resilient mounting strip 77 is carried by the outer frame of the window structure 33 by an oppositely flanged element 82 which has a portion fixedly attached to the frame of the window structure 33 and an opposite portion which is fixedly imbedded within the resilient mounting strip 77.

As illustrated in Figs. 8 and 10, the lower structure of the window portion of the side frame and the manner of interconnecting the bottom edge margins of the window trim panels 32 and the upper edge margins of the wainscoting panels 35 is the same as that described in connection with Figs. 8 and 9. The lowermost marginal edge of the leg portion 75 of the window trim panel 32 is resiliently received between spaced lips 78 of a longitudinally extending continuous resilient mounting strip 70 positioned below the window structure 33. The mounting strip 70 forms the panel mounting member 34 and is identical in design and function as that described in connection with the panel mounting member 31. Consequently, in Figs. 8 and 10 the same reference numerals are used to designate like parts.

The resilient panels mounting strip 70 of the panel mounting member 34 is carried by a structural member 73 having a channel portion 72 and mounted relative to the outer frame 21 by a transverse member 74. Thus, the lower horizontal edge portions of the window trim panels 32 and the upper horizontal edge portions of the wainscoting panels 35 are resiliently mounted relative to the outer frame 21 to prevent transmission of vibration or operational forces thereto through the structural members forming the outer frame 21.

The lower portion of the interior finish includes a series of air intake distributing panels 37 as previously described and in Figs. 11 and 12 the details of these panels and the mounting arrangement of the same are shown. The upper marginal edge portions of the air distributing panels 37 are reversely folded as at 85 and are attached to the lower marginal edges of the wainscoting panels 35 and a mounting bracket 86 by means of spaced fasteners 87. The mounting bracket 86 is longitudinally continuous and has attached thereto at spaced intervals a plurality of resilient block-like connectors generally designated by the numeral 88. The resilient connectors 88 are of the same construction and design as the connectors 58 illustrated and described in Fig. 6. The connectors 88 are provided with a resilient body portion 89 made from resilient rubber or rubber-like material having spaced threaded fasteners 90 imbedded therein and oppositely directed from the ends thereof. The downwardly directed fastener 90 extends through an aperture in the mounting bracket 86 and is suitably attached thereto while the remaining fastener 90 is connected to a second mounting bracket 91 which is suitably attached to an outer frame structural member 92. As shown in Fig. 12, the structural member 92 is in the form of a vertically directed rib-like member and the outer frame 21 includes a plurality of such members longitudinally spaced therealong. Thus, with each of the spaced structural members 92 a resilient connector 88 is provided to resiliently interconnect the interfastened marginal edges of the wainscoting panels 35 and air distributing panels 37 relative to the outer frame 21.

The lower margin of the continuous supporting bracket 86 has attached thereto by a series of longitudinally spaced fasteners 94 a heater element supporting baffle 95 which is positioned behind the air distributing panel 37. The baffle carries a heating element 96 suitably attached to the rear face thereof by fastening means 97. The panels 37 are provided with louvers 98 to allow a flow of air therethrough. The bottom portion of the plate 95 has suitably attached thereto an angle support 100 which is apertured throughout the length thereof to allow cold air to be moved under the influence of thermo convection through the louvers 98 of the air distributing panels 37 downwardly through the support 100 and upwardly into contact with the heating element 96. The heating element 96 is any known type of electrically operated heater and the flow of air is indicated by the series of arrows in Fig. 11. The air flows upwardly behind the interior finish including the wainscoting panels 35 and is delivered into the interior of the car through a series of louvers 102 in the top portion of each of the wainscoting panels 35 as shown in Figs. 1 and 2.

The lower marginal edges of the air intake panels 37 are reversely folded as indicated by the numeral 104 and are attached by longitudinally spaced screws 105 to a connecting strip 106 which in turn is attached to the apertured angle member 100. A strip spacer 107 is positioned intermediate the reversely folded portion 104 and the opposed surface of the connecting strip 106. The connecting strip 106 is suitably attached to the nearest edge portion of the flooring 38 and any desired floor surfacing 108 is applied to the base 38 to finish off the interior of the car. The flooring 38 is supported by transversely spaced longitudinally continuous beams 109 attached to the bottom surface of the flooring and resiliently mounted on the underframing 22 by resilient blocks 110 of rubber or rubber-like material. The bottom surface of the block strips 110 is provided with a series of grooves 111 to impart to the strips the requisite resiliency to allow relative movement between the underframing 22 and the flooring 38. The spacing of the resilient strips 110 is particularly shown in Fig. 1.

With the use of the resilient connectors 88 and the resilient floor mounting strips 110, the panels 35 and 37 are completely resiliently mounted relative to the outer frame 21 and the underframing 22. Likewise the flooring 38 is resiliently mounted relative to the underframing 22. In addition to the interior finish panels being resiliently connected to the outer frame 21, the entire heating apparatus including the heating element 96 is resiliently carried and the transmission of operational forces to these particular elements, often resulting in decreased operational efficiency, is thus alleviated. The entire interior finish including all of the panels forming the same is resiliently supported by the outer frame 21 and the transmission of operational noises or vibrations as well as damaging or destructive forces is eliminated to an extent that passenger comfort and long-life operating efficiency is enhanced. The frieze panels 27 and the air distributing panels 37, being resiliently held in their operative positions, are protected against damage due to the application of forces from the interior of the car such as by contact from baggage being thrown into the baggage rack 26 and inadvertent kicking of the air distributing panels 37 by the passengers in their seated position. The entire inner structure from its side connections to the overhead utility housing 24 is an integral structure resiliently mounted in every respect to the outer frame 21. Consequently, a shell-within-a-shell arrangement exists, the inner shell formed from the interior finish elements being relatively unaffected by stresses and strains applied to the outer shell formed by the outer framing 21. As previously described, the structural details of the outer frame 21 have not been disclosed as any suitable structural arrangement may be utilized. In addition adequate insulation is preferably provided within the outer frame 21 to further protect against heat loss.

Referring particularly to Fig. 2 it will be noted, as previously described, that the frieze, window trim and wainscoting as well as air distributing sections of the interior finish are formed from a series of panels placed in end-to-end relation. The vertical abutting edges of the panels of each series are interconnected with one another independent of the outer frame 21 by any suitable means. As shown in Fig. 2, a vertically directed back-up strip 112 overlaps the rear faces of the abutting vertical edges of each of the panels and suitable fastening elements, such as screws 113, interconnect each of the panels to one another through the connecting strips 112.

In manufacturing the interior finish described it is necessary merely to provide the required number of panels for each series, each of the panels being manufactured in exactly the same manner and in substantially each instance being interchangeable with another panel of the same series. Upon installation the panels may be placed in their operative position one by one and in each instance the panel is easily and quickly installed. No large one-piece structure is necessary and the use of highly trained personnel is eliminated. As an example of ease of installation, each of the frieze and wainscoting panels may be readily inserted in the grooves 80 of their respective resilient mounting members 31 and 34 and the opposite margins of the panels readily attached to the mounting brackets forming a part of the remaining panel mounting members 26 and 36. With respect to the window trim panels 32, no fixed fastening is necessary except along the vertical edge margins of the leg portions 75 as previously described. The window panels are readily inserted in the resilient mounting members 70 and 77 and may readily be removed therefrom for replacement purposes or for other purposes to be described. The window trim panels 32 need not be of one-piece design but may be formed from four separate side elements, the upper and lower ones of which are received and held by the cooperating offset resilient mounting strips 70 and 77 and the vertical side elements being attached to adjacent elements and held by the mounting strip 77.

A particular advantage accompanying the use of the interior finish of the present invention resides in the standardization of panel construction and the ease of assembly and replacement of the same. Passenger cars of different interior layout are desired and in following conventional manufacturing practices it is necessary to specifically design the interior of each car to conform with the particular use intended. As an example, one car may be completely devoted to passenger seating while another car may be subdivided into passenger seating, rest room area or lunch counter. With the use of the interior side frame construction and finish of the present invention, each car manufactured may be adapted for different uses without the necessity of costly specific designing of the same. With standardization of panel members it is possible to provide window areas where desired or dead light panels, such as the panel 114 shown in Fig. 2. As illustrated, the panel 114 is of the same outer dimensions as a window trim panel 32 and is readily received between the upper mounting member 31 and the lower mounting member 34. The vertical end edges of the same may be suitably attached to adjacent vertical edges of the window panels 32 in the manner previously described. Consequently, a dead light area is provided without resorting to special designing of the particular car area. Not only is this feature of particular advantage in initial manufacturing procedures, but during subsequent use of a finished car a dead light panel may readily replace a window trim panel if the space adjacent the same on the interior of the car is put to a different use.

As shown in Fig. 1, a dividing wall or bulkhead 115 provided with a door frame 116 and door 117 may readily be provided at any location throughout the interior of the car 20. The door carrying partition 115 may be entirely supported by the interior finish and thus function with the same during the operation of the car by being resiliently isolated from the outer frame 21. This particular advantage arises from the shell-within-a-shell arrangement described.

Obviously many modifications and variations of the invention as hereinbefore set forth may be made without departing from the spirit and scope thereof, and therefore only such limitations should be imposed as are indicated in the appended claims.

We claim:

1. In a vehicle body, an interior trim panel mounting arrangement to provide ease of assembly and replacement of panels carried thereby and vibration dampening, said arrangement including a plurality of spaced and substantially parallel panel supporting members connected to and carried by outer structural members forming a part of the vehicle body, resilient means forming a part of each of said panel supporting members interconnecting the panels supported thereby and said outer structural members to at least substantially isolate the panels from the effect of movement of said outer structural members and the transmission of vibration from said outer structural members to said panels, said panel supporting members being arranged in paired relation with each pair resiliently mounting therebetween a panel, the resilient means of one member of each of said pairs defining the connection of said member with the outer structural member carrying the same with said resilient means being out of direct engagement with a panel, the resilient means of the other member of each of said pairs releasably directly engaging an edge portion of a panel carried between the same and said first named member.

2. In a vehicle body, an interior trim panel mounting arrangement to provide ease of assembly and replacement of panels carried thereby and vibration dampening, said arrangement including a plurality of spaced and substantially parallel panel supporting members connected to and carried by outer structural members forming a part of the vehicle body, resilient means forming a part of each of said panel supporting members interconnecting the panels supported thereby and said outer structural members to at least substantially isolate the panels from the effect of movement of said outer structural members and the transmission of vibration from said outer structural members to said panels, said panel supporting members being arranged in paired relation with each pair resiliently mounting therebetween a panel, one member of each of said pairs being provided with fixed and rigid panel edge clamping means with the resilient means thereof defining the connection with said outer structural members and the other member of each of said pairs being provided with a resiliently defined panel edge receiving groove forming a part of its resilient means.

3. In a vehicle, a window trim panel assembly resiliently supported by an outer frame of said vehicle to provide ease of assembly and replacement and vibration dampening with respect to the panel forming a part thereof, said assembly including paralleling spaced resilient panel holding means connected to said outer frame and which are offset relative to one another, said panel being formed from sections each of substantially J-shaped cross section having differently directed leg portions, each of said holding means having flexible lips defining outwardly opening grooves into which edge portions of said panel are received and resiliently held.

4. In a vehicle, a window trim panel assembly resiliently supported by an outer frame of said vehicle to provide ease of assembly and replacement and vibration dampening with respect to the panel forming a part thereof, said panel being of a one-piece frame-like design the cross section of any portion thereof being substantially J-shaped to define circumferentially continuous leg portions, paralleling spaced resilient panel holding means connected to said outer frame and which are offset relative to one another, each of said holding means having flexible lips defining outwardly opening grooves into which edge portions of said panel are received and resiliently held.

5. A side frame construction for vehicles including outer frame structural members, removable interior finish panels resiliently mounted in longitudinally extending end-to-end relation on said outer frame structural members in substantially parallel relation thereto, vertically spaced longitudinally extending panel mounting members of different structural arrangement carried by said outer frame structural members and associated with the top and bottom edges of each of said panels, one form of said panel mounting members including a pair of resiliently interconnected bracket-like strips, one of which is attached to a structural member of said outer frame and the other of which is attached to one edge portion of a panel, the resilient interconnection being provided by an element of resilient material attached to said strips, the other form of said panel mounting members including a resilient member having a portion retained by a mounting strip carried by said outer frame and a portion provided with spaced flexible lips gripping therebetween the opposite edge portion of said panel, adjacent ends of adjacent panels being interconnected with one another independent of said outer frame.

6. A side frame construction for vehicles including outer frame structural members, removable interior finish panels resiliently mounted in longitudinally extending end-to-end relation on said outer frame structural members in substantially parallel relation thereto, vertically spaced longitudinally extending panel mounting members of different structural arrangement carried by said outer frame structural members and associated with the top and bottom edges of each of said panels, one form of said panel mounting members including a pair of resiliently interconnected bracket-like strips one of which is attached to a structural member of said outer frame and the other of which is attached to one edge portion of a panel, the resilient interconnection being provided by a block-like element of resilient material having oppositely directed fasteners with portions imbedded and fixedly held therein in spaced relation, the other form of said panel mounting members including a resilient member having a portion retained by a mounting strip carried by said outer frame and a portion provided with spaced flexible lips gripping therebetween the opposite edge portion of said panel, adjacent ends of adjacent panels being interconnected with one another independent of said outer frame.

7. A side frame construction for vehicles including outer frame structural members, removable interior finish panels resiliently mounted in longitudinally extending end-to-end relation on said outer frame structural members in substantially parallel relation thereto, vertically spaced longitudinally extending panel mounting members of different structural arrangement carried by said outer frame structural members and associated with the top and bottom edges of each of said panels, one form of said panel mounting members including a pair of resiliently interconnected bracket-like strips one of which is attached to a structural member of said outer frame and the other of which is attached to one edge portion of a panel, the resilent interconnection being provided by an element of resilient material attached to said strips, the other form of said panel mounting members including a resilient member having a portion retained by a mounting strip, carried by said outer frame and a portion provided with spaced flexible lips gripping therebetween the opposite edge portion of said panel, the flexible lips being outwardly convergent in non-gripping condition and defining therebetween a continuous outwardly opening groove, the outermost end portions of said lips gripping said panel to hold said panel in spaced relation to the base of said groove, adjacent ends of adjacent panels being interconnected with one another independent of said outer frame.

8. A side frame construction for vehicles including outer frame structural members, removable interior finish panels resiliently mounted in longitudinally extending end-to-end relation on said outer frame structural members in substantially parallel relation thereto, vertically spaced longitudinally extending panel mounting members of different structural arrangement carried by said outer frame structural members and associated with the top and bottom edges of each of said panels, one form of said panel mounting members including a pair of resiliently interconnected bracket-like strips one of which is attached to a structural member of said outer frame and the other of which is attached to one edge portion of a panel, the resilient interconnection being provided by a block-like element of resilient material having oppositely directed fasteners with portions imbedded and fixedly held therein in spaced relation, the other form of said panel mounting members including a resilient member having a portion retained by a mounting strip carried by said outer frame and a portion provided with spaced flexible lips gripping therebetween the oposite edge portion of said panel, the flexible lips being outwardly convergent in non-gripping condition and defining therebetween a continuous outwardly opening groove, the outermost end portions of said lips gripping said panel to hold said panel in spaced relation to the base of said groove, adjacent ends of adjacent panels being interconnected with one another independent of said outer frame.

9. A side frame construction for vehicles including vertically spaced rows of removable interior finish panels resiliently mounted in longitudinally extending end-to-end relation on outer frame structural members in substantially parallel relation thereto, a row of window structures including window trim frames intermediate said rows of panels, vertically spaced longitudinally extending frame and panel mounting members of different structural arrangement carried by said outer frame structural members and associated with the top and bottom edges of each of said frames and panels, one form of said panel mounting members including a pair of resiliently interconnected bracket-like strips one of which is attached to a structural member of said outer frame and the other of which is attached to one edge portion of a panel, the other form of said panel mounting members including a resilient member having a portion retained by a mounting strip carried by said outer frame and a portion provided with pairs of oppositely directed spaced flexible lips gripping therebetween the opposite edge portion of said panel and an edge portion of a frame, adjacent ends of adjacent panels and frames being interconnected with one another independent of said outer frame, said first named form of panel mounting members being associated with the top edge portions of the upper series of panels and the bottom edge portion of the lower series of panels, the other form of panel mounting members resiliently interconnecting adjacent longitudinal edge portions of the panels of both of said series and said frames.

10. A side frame construction for vehicles including vertically spaced rows of removable interior finish panels resiliently mounted in longitudinally extending end-to-end relation on outer frame structural members in substantially parallel relation thereto, a row of window structures including window trim frames intermediate said rows of panels, vertically spaced longitudinally extending frame and panel mounting members of different structural arrangement carried by said outer frame structural members and associated with the top and bottom edges of each of said frames and panels, one form of said panel mounting members including a pair of resiliently interconnected bracket-like strips one of which is attached to a structural member of said outer frame and the other of which is attached to one edge portion of a panel, the resilient interconnection being provided by block-like elements of resilient material having oppositely directed fasteners with portions imbedded and fixedly held therein in spaced relation, the other form of said panel mounting members including a resilient member having a portion retained by a mounting strip carried by said outer frame and a portion provided with pairs of oppositely directed spaced flexible lips gripping therebetween the opposite edge portion of said panel and an edge portion of a frame, the flexible lips of each pair being outwardly convergent in non-gripping condition and defining therebetween a continuous outwardly opening groove, the outermost end portions of said lips gripping said panel and frame to hold said panel and frame in spaced relation to the base of said groove, adjacent ends of adjacent panels and frames being interconnected with one another independent of said outer frame, said first named form of panel mounting members being associated with the top edge portions of the upper series of panels and the bottom edge portions of the lower series of panels, the other form of panel mounting members resiliently interconnecting adjacent longitudinal edge portions of the panels of both of said series and said frames.

References Cited in the file of this patent

UNITED STATES PATENTS

| | | |
|---|---|---|
| 1,972,005 | Berbeck | Aug. 28, 1934 |
| 2,083,553 | Blomberg | June 15, 1937 |
| 2,297,051 | Dean | Sept. 29, 1942 |
| 2,411,226 | Pehrson | Nov. 19, 1946 |
| 2,595,212 | Ledwinka et al. | Apr. 29, 1952 |